INVENTOR.
OSCAR E. ROSAEN

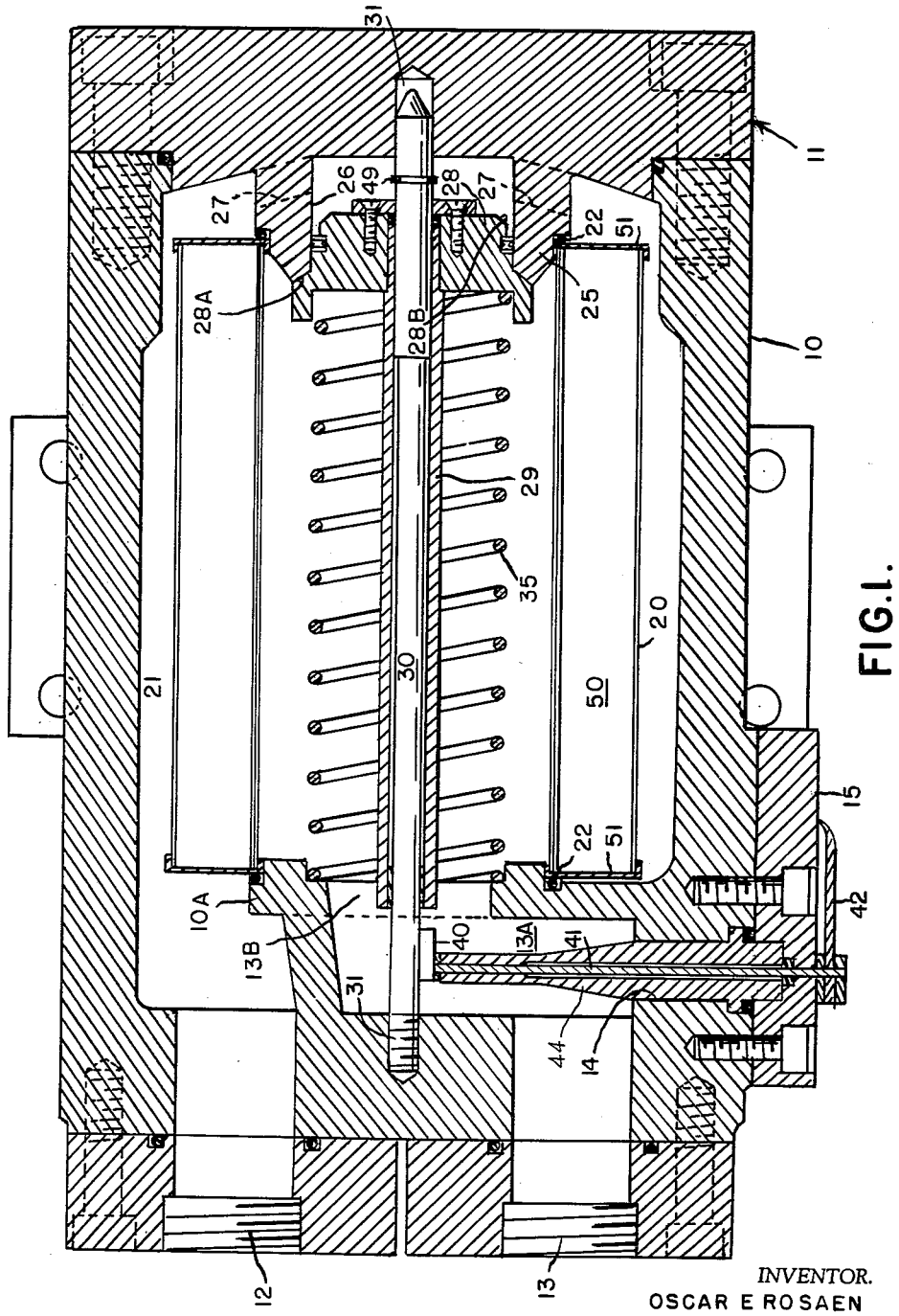

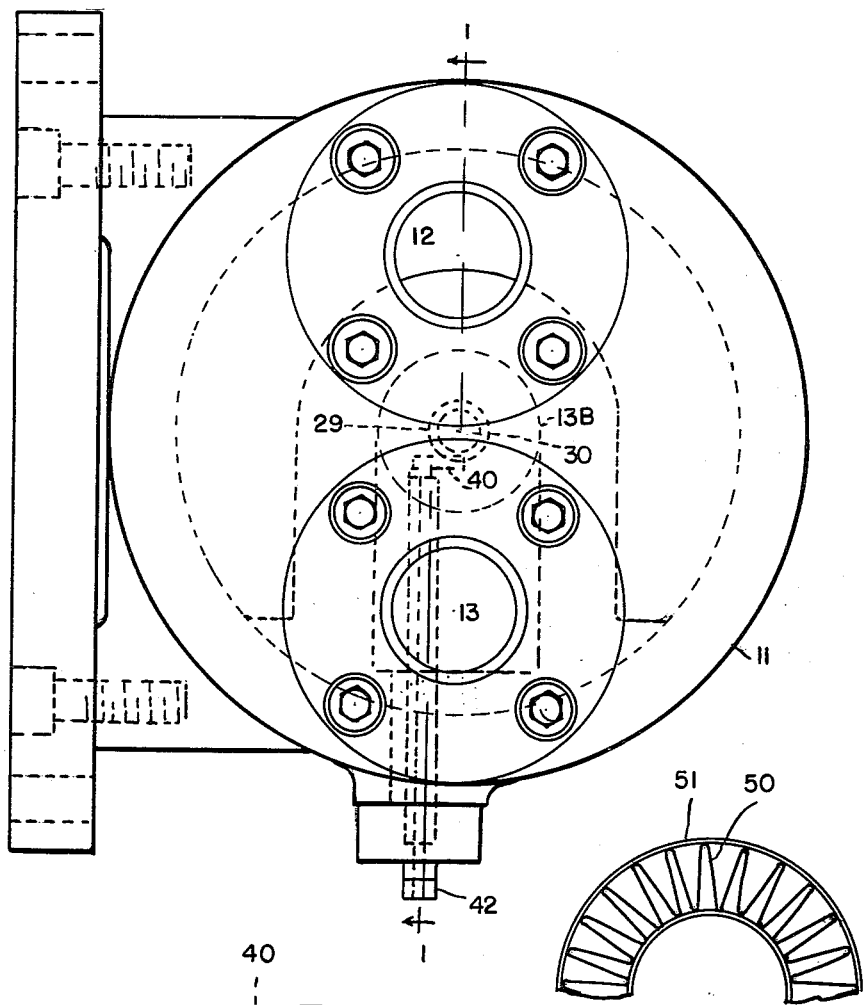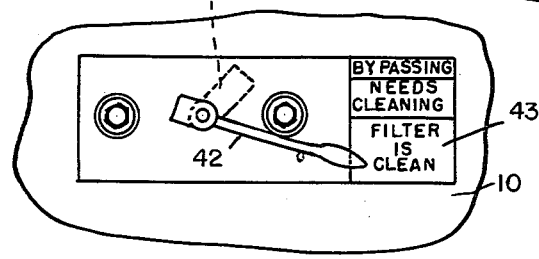

ATTORNEYS even when the piston has moved to bypassing position, and a crank arm contacting the end of said tube and actuated thereby.

3,080,058
PRESSURE FILTER
Oscar E. Rosaen, Grosse Pointe Farms, Mich., assignor to The Rosaen Filter Company, Hazel Park, Mich., a corporation of Michigan
Filed Oct. 6, 1958, Ser. No. 765,604
4 Claims. (Cl. 210—90)

The present invention relates to fluid filters and more specifically to filters through which the fluid is forced as distinguished from those through which the fluid is drawn.

Among the objects of the invention is to provide a filter of the type indicated in which the progress of clogging may be observed.

Another object is to provide such a filter with means by which fluid may be bypassed when clogging has proceeded to a predetermined degree.

Still other objects and advantages will readily appear to those skilled in the art upon reference to the following description and the accompanying drawings, in which:

FIGURE 1 is a central longitudinal section of a filter of the present invention on line 1—1 of FIGURE 2.

FIGURE 2 is an end elevation of the same as from the left of FIGURE 1.

FIGURE 3 is a partial view in elevation as from the bottom of FIGURE 1.

FIGURE 4 is a part sectional view of a detail of construction of the filtering element.

Figure 5:
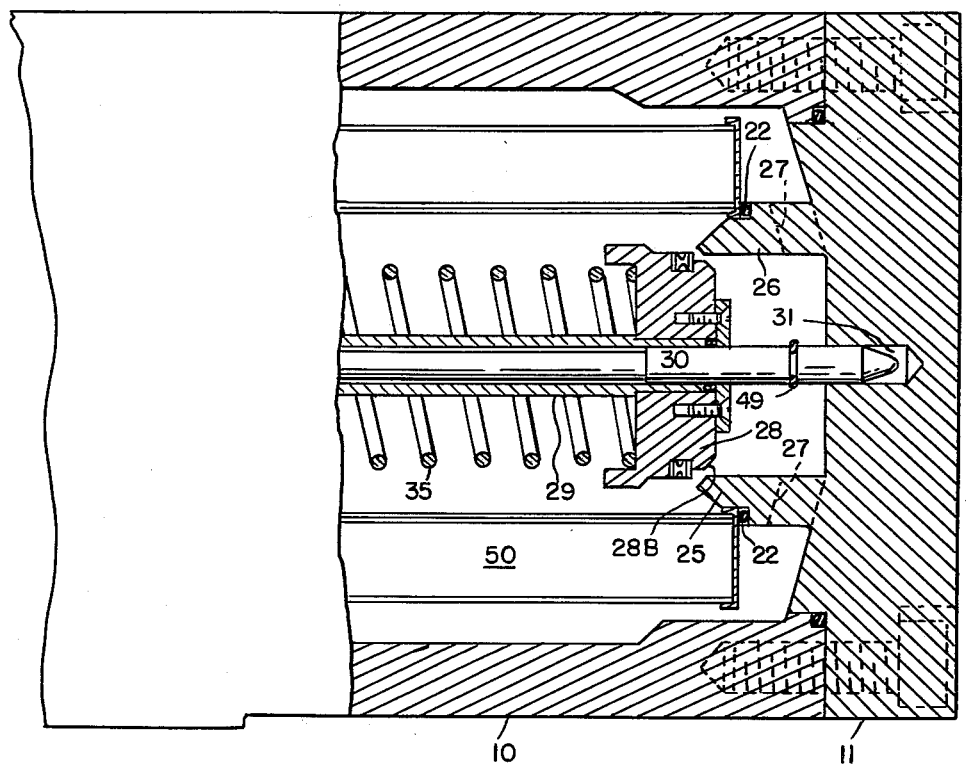
FIGURE 5 is a part sectional view similar to FIGURE 1 but showing the parts in bypassing position.

As indicated in the drawings, a filter involving the invention may consist of a preferably cylindrical shell 10 closed at one end by a cover plate 11 and having at its other end an inlet 12 and an outlet 13. The inlet 12 opens directly to the space within the shell near the outer wall, while the outlet 13 communicates with the shell at its axis through a transverse passage or chamber 13A and axial opening 13B. Shell 10 is also provided with a small radially arranged passage 14 leading from chamber 13A to the outside and closed by a plate 15.

Axially arranged within the shell 10 over the outlet opening 13B is a hollow cylindrical filter 20, this being clamped between the end wall 10A of the shell and the cover plate 11, suitable shoulders and gaskets 22 being provided to produce fluid tight joints. The filter cylinder will be of such diameter as to provide a space 21 between it and the shell open to the inlet 12.

The shoulder 22 on the cover plate 11 is formed on the outer wall of an inwardly projecting circular rib or flange 25, which is bored to form a cylinder 26 open to the space 21 through passages 27, and slidably fitted therein is a piston 28.

Piston 28 is fixed to the end of a tube 29 and through both tube and piston extends a guide rod 30 mounted in suitable sockets 31 in end wall 10A and in the cover plate 11.

The piston 28 as shown clearly in FIGURE 1 is provided with a perimetral shoulder 28A abutting the rib 25 and limiting its movement inward of cylinder 26. It is also beveled at its inner end as at 28B for a purpose to be mentioned later.

Movement of the piston 28 outwardly of cylinder 26 is resisted by a suitable helical spring 35 abutting the piston and the end wall 10A of the shell.

As will be noted from FIGURE 1, the tube 29 extends from the piston 28 to a short distance within the outlet opening 13B, and contacts a short lever or crank arm 40 fixed upon a shaft 41 rotatably mounted in a sleeve 44, the sleeve and shaft extending into chamber 13A through passage 14 in the shell 10, the sleeve being seated at its outer end in a bore in the plate 15 as shown and the shaft extending through the plate and carrying an indicator hand 42. A suitable legend plate 43 will be arranged adjacent the indicator hand to indicate the significance of the movement of the hand.

The cylindrical filter element 20 is a standard commercial product and as indicated in FIGURE 4 consists of corrugated fibrous filter material 50 fixed to and between suitable annular plates 51.

In the operation of the filter, oil or other fluid to be filtered is pumped under pressure into the space 21 around the filter 20 passing therethrough to the inner space and as the filtered out solids collect on the filter, the pressure differential between the spaces inside and outside the filter will begin to increase. Such differential pressure acts upon piston 28, tending to move it against the resistance of spring 35.

When the pressure differential is sufficient, the piston 28 will move far enough to open communication between cylinder 26 and the space within the filter by virtue of the bevel surface 28B being uncovered by the cylinder wall.

FIGURE 5 shows the position of the piston 28 and associated parts in filter-clogged bypassing condition. However, as the piston moves, the end of tube 29 moves the crank arm 40 and thereby rotates shaft 41 to move the hand 42 over the legend plate 43 to indicate the position of the piston 28 and thereby the condition of the filter.

When it becomes necessary to remove the end plate 11 to change filters, the piston-tube assembly is prevented from being ejected by the spring 35, by means of a snap ring 49 carried by the end portion of the rod 30.

I claim:
1. A liquid filter consisting of a casing provided with a fluid inlet opening to near the inner periphery of said casing, an axially located fluid outlet leading from one end of the casing, a hollow filter element axially disposed in said casing having one end thereof surrounding said outlet, a cover plate closing the other end of the casing, said plate having an inwardly projecting rib located concentric with said filter element and outlet opening closing and supporting the other end of said filter element so that normal flow of liquid from the inlet to the outlet is through the walls of said filter element, a cylinder formed within said rib opening into said last mentioned end of said filter element, a piston slidably mounted within said cylinder and normally closing communication between said cylinder and the interior of said filter element, passage means leading from the space within the casing outside of the filter element to said cylinder upstream of said piston, said piston formed to have an appreciable and extended sliding movement within said cylinder before said piston opens said cylinder to the space within said filter element for by-passing of fluid directly to said outlet, guide means for said piston, a spring acting to resist movement of said piston outwardly of said cylinder, and means visible outside of said casing for indicating the position of said piston and the condition of the filter element, whether clean, in need of cleaning, or by-passing, said last mentioned means including a legend plate mounted on the exterior of said casing, a rotatable shaft extending through said casing transverse to the direction of movement of said piston, an actuating element movable responsive to movement of said piston, a crank arm fixed to the inner end of said shaft and at substantially right angles thereto with its end positioned to be engaged and moved by movement of said actuating element on movement of said piston to thus rotate said shaft and an indicator hand fixed to the outer end of said shaft for movement over said legend plate.

2. A liquid filter as specified in claim 1 wherein said actuating element comprises a tube fixed to said piston and extending axially of said filter into said outlet and said guide means comprises a rod passing through said piston and tube and extending longitudinally of said casing with said rotatable shaft extending into said outlet with the crank arm having its end positioned to be engaged and actuated by the end of said tube.

3. A liquid filter as specified in claim 2 wherein said guide rod has one end anchored to a wall of said casing and the other end removably received and supported by the inner face of said cover plate.

4. A liquid filter as specified in claim 3 wherein the end of said guide rod that is removably received and supported by said cover plate is provided with stop means to retain said piston on said rod whenever the cover plate is removed from the casing.

References Cited in the file of this patent

UNITED STATES PATENTS

| | | |
|---|---|---|
| 511,798 | Rankine | Jan. 2, 1894 |
| 2,400,200 | Katcher | May 14, 1946 |